US010920795B2

(12) United States Patent
Plamondon (10) Patent No.: US 10,920,795 B2
(45) Date of Patent: Feb. 16, 2021

(54) BOOTSTRAP HYDRAULIC RESERVOIR

(71) Applicant: The Boeing Company, Chicago, IL (US)

(72) Inventor: Morgan Michael Plamondon, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/199,106

(22) Filed: Nov. 23, 2018

(65) Prior Publication Data

US 2020/0166055 A1 May 28, 2020

(51) Int. Cl.
*F15B 1/02* (2006.01)
*F15B 1/027* (2006.01)
*F15B 1/26* (2006.01)
*F15B 13/02* (2006.01)

(52) U.S. Cl.
CPC .............. *F15B 1/024* (2013.01); *F15B 1/027* (2013.01); *F15B 1/265* (2013.01); *F15B 13/027* (2013.01); *F15B 2201/411* (2013.01); *F15B 2211/205* (2013.01); *F15B 2211/30505* (2013.01)

(58) Field of Classification Search
CPC .......... F15B 1/024; F15B 1/022; F15B 1/027; F15B 1/265; F15B 2211/205; F15B 2201/411
See application file for complete search history.

(56) References Cited

U.S. PATENT DOCUMENTS 4,924,753 A * 5/1990 Tassie .................. F41A 9/49
89/12

FOREIGN PATENT DOCUMENTS

| EP | 0356780 A1 | 3/1990 |
| EP | 1731769 A1 | 12/2006 |
| GB | 797296 A | 7/1958 |
| WO | 2014000858 A1 | 1/2014 |

OTHER PUBLICATIONS

"Office Action Issued in European Patent Application No. 19202920. 5", dated Mar. 23, 2020, 12 Pages.

* cited by examiner

*Primary Examiner* — Abiy Teka (57) ABSTRACT

A bootstrap hydraulic reservoir includes a bootstrap chamber to hold hydraulic fluid, a piston chamber fluidly connected to a pressure line of the hydraulic fluid system, a piston having a bootstrap end portion held within the bootstrap chamber and a pressure end portion held within the piston chamber, and a hydraulic accumulator fluidly connected to the pressure line of the hydraulic fluid system. The hydraulic accumulator accumulates pressurized hydraulic fluid from the pressure line. The bootstrap hydraulic reservoir also includes a valve fluidly connected to the pressure line of the hydraulic fluid system between the hydraulic accumulator and an outlet of a pump of the hydraulic fluid system. The valve includes an actuator selectively moves the valve to an open position when the pressure line of the hydraulic fluid system is de-pressurized.

20 Claims, 7 Drawing Sheets

BOOTSTRAP HYDRAULIC RESERVOIR

BACKGROUND

Many aircraft include hydraulic fluid systems for powering various actuators of the aircraft. Hydraulic fluid systems provide a convenient form of condensed power that is easily distributed throughout the aircraft. It is also common to provide redundant hydraulic fluid systems for powering actuators that control movable flight control surfaces such as ailerons, elevators, rudders, leading edge slats, trailing edge flaps, horizontal stabilizers, spoilers, air brakes, and/or the like. It can be useful during flight of the aircraft to have extra and/or backup hydraulic power available, for example during a hydraulic fluid system failure, shutdown, and/or other scenarios. At least some known hydraulic fluid systems include hydraulic accumulators to provide stored energy in the event that extra and/or backup hydraulic power is desired. For example, the energy stored by a hydraulic accumulator can be used to move an actuator to, and/or hold the actuator in, a displacement position during a hydraulic fluid system failure, shutdown, or other emergency situation. But, hydraulic accumulators can add appreciable weight and/or complexity to the hydraulic fluid system and thereby the aircraft. The added weight of a hydraulic accumulator can be particularly costly to the efficiency of an aircraft when considering that each redundant hydraulic fluid system of the aircraft is provided with a dedicated hydraulic accumulator, thereby multiplying the weight penalty of a single hydraulic accumulator by the number of redundant systems.

A need exists for a providing extra and/or backup hydraulic power that adds less weight and is thereby less costly to the efficiency of an aircraft.

SUMMARY

With those needs in mind, certain embodiments of the present disclosure provide a bootstrap hydraulic reservoir for a hydraulic fluid system. The bootstrap hydraulic reservoir includes a bootstrap chamber to hold hydraulic fluid, a piston chamber fluidly connected to a pressure line of the hydraulic fluid system, a piston having a bootstrap end portion held within the bootstrap chamber and a pressure end portion held within the piston chamber, and a hydraulic accumulator fluidly connected to the pressure line of the hydraulic fluid system such that the hydraulic accumulator is configured to accumulate pressurized hydraulic fluid from the pressure line. The bootstrap hydraulic reservoir also includes a valve fluidly connected to the pressure line of the hydraulic fluid system between the hydraulic accumulator and an outlet of a pump of the hydraulic fluid system. The valve includes a closed position. The valve includes an actuator selectively moves the valve to an open position when the pressure line of the hydraulic fluid system is de-pressurized.

Certain embodiments of the present disclosure provide a hydraulic fluid system that includes a hydraulic pump having an inlet and an outlet, a pressure line, a device actuator fluidly connected to the outlet of the hydraulic pump via the pressure line, a bootstrap hydraulic reservoir. The bootstrap hydraulic reservoir includes a bootstrap chamber to hold hydraulic fluid, a piston chamber fluidly connected to the pressure line, a piston having a bootstrap end portion held within the bootstrap chamber and a pressure end portion held within the piston chamber, and a hydraulic accumulator fluidly connected to the pressure line such that the hydraulic accumulator is configured to accumulate pressurized hydraulic fluid from the pressure line. The bootstrap hydraulic reservoir also includes a valve fluidly connected to the pressure line between the hydraulic accumulator and the outlet of the pump. The valve includes a closed position. The valve includes a valve actuator to selectively move the valve to an open position when the pressure line is de-pressurized.

Certain embodiments of the present disclosure also provide a bootstrap hydraulic reservoir for a hydraulic fluid system. The bootstrap hydraulic reservoir includes a bootstrap chamber to hold hydraulic fluid, a piston chamber fluidly connected to a pressure line of the hydraulic fluid system, a piston having a bootstrap end portion held within the bootstrap chamber and a pressure end portion held within the piston chamber, and a hydraulic accumulator fluidly connected to the pressure line of the hydraulic fluid system such that the hydraulic accumulator is configured to accumulate pressurized hydraulic fluid from the pressure line. The bootstrap hydraulic reservoir also includes a check valve fluidly connected to the pressure line of the hydraulic fluid system between the hydraulic accumulator and an outlet of a pump of the hydraulic fluid system. The check valve is biased to a closed position wherein the hydraulic accumulator supplies pressurized hydraulic fluid to the piston chamber. The check valve includes an actuator to selectively move the check valve against the bias to an open position when the pressure line of the hydraulic fluid system is de-pressurized.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain embodiments of the present disclosure enable a hydraulic accumulator to serve a dual purpose of maintaining pressure within a bootstrap chamber and providing backup hydraulic power to a hydraulic fluid system. The dual use of the hydraulic accumulator enables the supply of backup hydraulic power to a hydraulic fluid system without the addition of a dedicated hydraulic accumulator to the hydraulic fluid system. Accordingly, the dual use of the hydraulic accumulator reduces the weight and complexity of the hydraulic fluid system and thereby increases the efficiency of an aircraft that includes the hydraulic fluid system.

Figure 1:
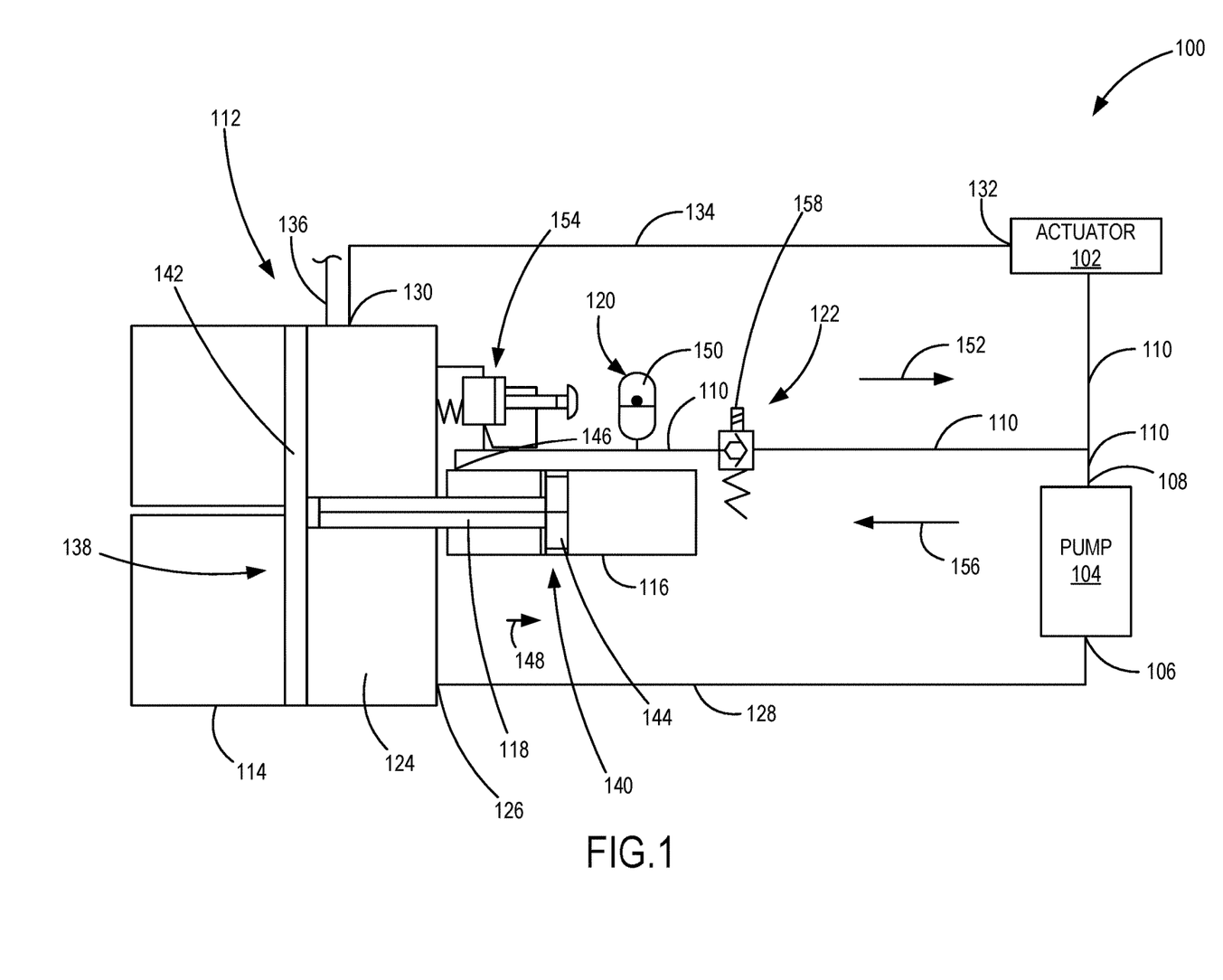
FIG. 1 is a schematic diagram of a hydraulic fluid system according to an embodiment of the present disclosure.

FIG. 1 is a schematic diagram of a hydraulic fluid system 100 according to an embodiment of the present disclosure. The hydraulic system can be used to drive (i.e., power) operation of one or more actuators 102 of an aircraft (e.g., an aircraft 700 shown in FIG. 7), such as, but not limited to, actuators that control flight control surfaces (e.g., ailerons, elevators, rudders, leading edge slats, trailing edge flaps, horizontal stabilizers, spoilers, air brakes, etc.), landing gear, doors, vents, thrust reversers, engine inlet bypass doors, engine variable geometry inlets, engine variable geometry nozzles, and/or the like. Each actuator 102 may be referred to herein as a "device actuator".

The hydraulic fluid system 100 includes one or more hydraulic pumps 104 and one or more of the actuators 102. Although only one hydraulic pump 104 and only one actuator 102 is shown for simplicity, it should be understood that the hydraulic fluid system 100 can include any number of hydraulic pumps 104 and any number of actuators 102. In some examples, the hydraulic fluid system 100 includes a variety of different actuators 102 driven by a plurality of dedicated hydraulic pumps 104, while in other examples the hydraulic fluid system 100 includes one or more hydraulic pumps 104 that each drives a plurality of the actuators 102.

The hydraulic pump 104 includes an inlet 106 that defines a suction side of the hydraulic pump 104 and an outlet 108 that defines a pressure side of the hydraulic pump 104. The actuator 102 is fluidly connected to the outlet 108 of the hydraulic pump 104 via a pressure line 110 of the hydraulic fluid system 100. During operation of the hydraulic pump 104, the actuator 102 receives pressurized hydraulic fluid from the hydraulic pump 104 through the pressure line 110.

The hydraulic fluid system 100 includes a bootstrap hydraulic reservoir 112. The bootstrap hydraulic reservoir 112 includes a bootstrap chamber 114, a piston chamber 116, a piston 118, a hydraulic accumulator 120, and a valve 122. As shown in FIG. 1, the valve 122 is fluidly connected to the pressure line 110. Operation of the valve 122 to provide backup hydraulic power from the hydraulic accumulator 120 will be described below. The bootstrap chamber 114 holds a volume of hydraulic fluid 124 to thereby provide a reservoir of hydraulic fluid for use by the hydraulic pump 104 during operation of the hydraulic fluid system 100. More particularly, the inlet 106 of the hydraulic pump 104 is fluidly connected to an outlet 126 of the bootstrap chamber 114 via a suction line 128 of the hydraulic fluid system 100. During operation of the hydraulic pump 104, the hydraulic pump 104 pulls hydraulic fluid from the bootstrap chamber 114 through the suction line 128. An inlet 130 of the bootstrap chamber 114 is fluidly connected to a return outlet 132 of the actuator 102 via a return line 134 of the hydraulic fluid system 100 to return hydraulic fluid to the bootstrap chamber 114 from the actuator 102 during retraction of the actuator 102. Optionally, the bootstrap chamber 114 includes a drain 136 for draining hydraulic fluid from the bootstrap chamber 114, for example to a ground service panel and/or the like.

As will be described below, the bootstrap hydraulic reservoir 112 provides positive suction pressure at the inlet 106 of the hydraulic pump 104. Accordingly, the piston 118 is operatively connected between the bootstrap chamber 114 and the piston chamber 116 to pressurize the hydraulic fluid 124 contained within the bootstrap chamber 114. More particularly, the piston 118 extends a length from a bootstrap end portion 138 and to a pressure end portion 140. The bootstrap end portion 138 is held within bootstrap chamber 114 and includes a bootstrap piston head 142 that extends within the bootstrap chamber 114. The pressure end portion 140 is held within the piston chamber 116 and includes a pressure piston head 144 that extends within the piston chamber 116. The piston chamber 116 is fluidly connected to the pressure line 110 of the hydraulic fluid system 100 at an inlet 146 of the piston chamber 116. As will be described below, the piston chamber 116 is configured to receive pressurized hydraulic fluid from the pressure line 110, for example during operation of the hydraulic pump 104, from the hydraulic accumulator 120 when the pressure line 110 is not pressurized (i.e., is de-pressurized) by the hydraulic pump 104, and/or the like.

During operation of the hydraulic fluid system 100, the hydraulic pump 104 pressurizes the pressure line 110, which pumps a flow of hydraulic fluid to the actuator 102 to thereby extend the actuator 102. The pressurization of the pressure line 110 also pumps pressurized hydraulic fluid to the piston chamber 116. The pressurized hydraulic fluid received into the piston chamber 116 acts against the pressure piston head 144 and thereby moves the piston 118 in the direction of the arrow 148. As the piston 118 moves in the direction 148, the bootstrap piston head 142 acts against the volume of hydraulic fluid 124 contained within the bootstrap chamber 114 to thereby pressurize the volume of hydraulic fluid 124. The pressurized hydraulic fluid 124 contained within the bootstrap chamber 114 provides the hydraulic pump 104 with positive suction pressure at the inlet 106.

When the hydraulic fluid system 100 is shut down, the pressure line 110 is de-pressurized, which results in a loss of compression and thereby de-pressurization of the hydraulic fluid 124 contained within the bootstrap chamber 114. The resulting loss of the positive suction pressure at the hydraulic pump 104 can cause the hydraulic pump 104 to cavitate when the hydraulic fluid system 100 is restarted. Accordingly, the bootstrap hydraulic reservoir 112 includes the hydraulic accumulator 120. As is shown in FIG. 1, the hydraulic accumulator 120 is fluidly connected to the pressure line 110. The hydraulic accumulator 120 includes an energy storage source 150 having a potential energy (e.g., a gas pressure, a spring force, a weight, etc.) that is less than the pressure of the hydraulic fluid within the pressure line 110 when the pressure line 110 is pressurized (i.e., less than the operating pressure of the hydraulic fluid system 100). The hydraulic accumulator 120 is thereby configured to accumulate pressurized hydraulic fluid from the pressure line 110 during operation of the hydraulic fluid system 100. In some examples, the potential energy of the energy storage source 150 of the hydraulic accumulator 120 dampens pressure spikes in the pressure line 110 during operation of the hydraulic fluid system 100.

In the embodiment of FIG. 1, the energy storage source 150 is a compressed gas such that the hydraulic accumulator 120 is a compressed gas accumulator (sometimes referred to as a "gas-charged accumulator"). But, the hydraulic accumulator 120 additionally or alternatively can include any type of accumulator, such as, but not limited to, a raised weight accumulator, a spring type accumulator, a bellows type accumulator, a bladder type accumulator, a piston accumulator, and/or the like.

In operation, when the hydraulic system 100 is shut down and the pressure line 110 de-pressurizes, the potential energy of the energy storage source 150 forces the hydraulic fluid accumulated by the hydraulic accumulator 120 into the pressure line 110 such that the piston chamber 116 receives pressurized hydraulic fluid through the inlet 146 from the hydraulic accumulator 120. The pressurized hydraulic fluid received by the piston chamber 116 from the hydraulic accumulator 120 maintains the pressure in the bootstrap chamber 114 (i.e., maintains the pressurization of the volume of hydraulic fluid 124 contained within the bootstrap chamber 114) and thereby maintains the pressure within the hydraulic system 100. Accordingly, the hydraulic pump 104 has positive suction pressure at the inlet 106 for use when the hydraulic fluid system 100 is restarted. In other words, positive suction pressure is available to the hydraulic pump 104 the next time the hydraulic fluid system 100 is started up. In the embodiment of FIG. 1, the valve 122 is a check valve that is biased to a closed position that prevents the pressurized hydraulic fluid supplied to the pressure line 110 by the hydraulic accumulator 120 from flowing within the pressure line 110 in the direction of the arrow 152 toward the outlet 108 of the hydraulic pump 104 when the hydraulic fluid system 100 is non-operational (i.e., has been shut down).

The bootstrap hydraulic reservoir 112 optionally includes a pressure relief valve 154 fluidly connected between the bootstrap chamber 114 and the pressure line 110 of the hydraulic fluid system 100. In some examples, the pressure relief valve 154 enables the bootstrap chamber 114 to be manually de-pressurized.

As briefly described above, the valve 122 can be used in combination with the hydraulic accumulator 120 to provide backup hydraulic power to the hydraulic fluid system 100. For example, the hydraulic power stored by the hydraulic accumulator 120 can be used to supply one or more actuators 102 of the hydraulic fluid system 100 with pressurized hydraulic fluid upon a failure of the hydraulic fluid system 100, a shutdown of the hydraulic fluid system 100, and/or other emergency, etc.) situation. In one example, the actuator 102 is supplied with pressurized hydraulic fluid from the hydraulic accumulator 120 to move the actuator 102 to a particular (e.g., fill, etc.) displacement upon failure and/or shutdown of the hydraulic fluid system 100. In one example, the actuator 102 is supplied with pressurized hydraulic fluid from the hydraulic accumulator 120 to hold the actuator 102 at a particular (e.g., full, etc.) displacement upon failure and/or shutdown of the hydraulic fluid system 100.

One example of a situation wherein hydraulic power stored by the hydraulic accumulator 120 can be used to supply one or more actuators 102 of the hydraulic fluid system 100 with pressurized hydraulic fluid is an engine failure. More particularly, the loss of an engine can result in a loss of at least some hydraulic power available from the hydraulic fluid system 100. The hydraulic accumulator 120 thus can be used to compensate for the lost hydraulic power from the engine failure. In one specific example, a sudden engine failure can require use of the rudder and/or one or more other flight control surfaces to compensate for the resulting asymmetric thrust. The hydraulic accumulator 120 can be used in such an engine failure to actuate the actuator(s) 102 associated with the rudder and/or other flight control surface(s) to counter the asymmetric thrust resulting from the engine failure. The hydraulic accumulator 120 can be a particularly important backup hydraulic power source in the event of an engine failure during take-off or landing, wherein the aircraft has less space and time to maneuver.

Another example of a situation wherein hydraulic power stored by the hydraulic accumulator 120 can be used to supply one or more actuators 102 of the hydraulic fluid system 100 with pressurized hydraulic fluid is to help open landing gear doors of the aircraft in the event that the hydraulic fluid system 100 is unavailable. For example, the landing gear doors on some aircraft can remain closed even when unlocked because of the external air pressure acting thereon.

As shown in FIG. 1, the valve 122 is fluidly connected to the pressure line 110 between the hydraulic accumulator 120 and the outlet 108 of the hydraulic pump 104. The valve 122 is moveable between an open position and a closed position. As described above, the example of the valve 122 is a check valve that is biased by a spring and/or other biasing mechanism to the closed position. In the closed position, the valve 122 prevents hydraulic fluid from flowing within the pressure line 110 through the valve 122 in the direction 152. During operation of the hydraulic fluid system 100 (i.e., when the pressure line 110 is pressurized), the valve 122 is configured to be moved to the open position against the bias by pressurized hydraulic fluid flowing through the pressure line 110 in the direction of the arrow 156 toward the piston chamber 116. In the open position, the pressurized hydraulic fluid flowing within the pressure line 110 in the direction 156 during operation of the hydraulic fluid system 100 flows through the valve 122 to the piston chamber 116 to thereby pressurize the volume of hydraulic fluid 124 contained within the bootstrap chamber 114.

The valve 122 includes an actuator 158 that is configured to selectively move the valve 122 to the open position (against the bias of the valve 122 to the closed position) when the pressure line 110 is de-pressurized, for example when the pressure line 110 is de-pressurized by a failure of the hydraulic fluid system 100, a shutdown of the hydraulic fluid system 100, and/or other (e.g., emergency, etc.) situation. By opening the valve 122 when the pressure line 110 is de-pressurized, the potential energy of the energy storage source 150 forces the hydraulic fluid accumulated by the hydraulic accumulator 120 into the pressure line 110 such that the hydraulic accumulator 120 supplies the pressure line 110 with pressurized hydraulic fluid that flows in the direction 152 toward the outlet 108 of the hydraulic pump 104. The pressurized fluid flowing from the hydraulic accumulator 120 through the pressure line 110 in the direction 152 flows to the actuator 102. Accordingly, when the pressure line 110 is de-pressurized and the actuator 158 moves the valve 122 to the open position, the hydraulic accumulator 120 supplies the actuator 102 with a flow of pressurized hydraulic fluid through the pressure line 110. The actuator 158 may be referred to herein as a "valve actuator".

In one embodiment, the actuator 158 is a solenoid. But, the actuator 158 additionally or alternatively can include any other type of actuator, such as, but not limited to, an electric motor, a linear actuator (e.g., a ball screw, a lead screw, a rotary screw, another screw-type actuator, a hydraulic linear actuator, a pneumatic linear actuator, a servo, another type of linear actuator, etc.), a hydraulic actuator (e.g., a hydraulic pump system, etc.), a pneumatic actuator, a servo, and/or the like.

In operation, the actuator 158 can be activated to selectively open the valve 122 on demand (e.g., using a control system of the aircraft, etc.) when backup hydraulic power to one or more actuators 102 is desired. Once the backup hydraulic power provided by the hydraulic accumulator 120 is no longer needed, the actuator 158 can be activated to allow the valve 122 to return to the closed position under the bias of the spring and/or other biasing mechanism of the valve 122. For example, the actuator 158 can be activated to allow the valve 122 to return to the closed position upon the arrival of the aircraft at a gate, hanger, and/or other parking location prior to shutdown of the aircraft's systems (e.g., the hydraulic fluid system 100, control systems, etc.), which may enable any remaining fluid pressure within the pressure line 110 and/or the hydraulic accumulator 120 to maintain pressure within the bootstrap chamber 114.

In some examples, the actuator 158 enables the bootstrap chamber 114 to be remotely de-pressurized, for example for performing maintenance on the aircraft. For example, an interface can be included on the aircraft maintenance page for remote reservoir depressurization by commanding the actuator 158 to move the valve 122 to the open position to allow the energy stored in the hydraulic accumulator 120 to dissipate into the hydraulic fluid system 100.

The configuration (e.g., the size, type, etc.) of the hydraulic accumulator 120 can be selected to provide the hydraulic accumulator 120 with a predetermined energy storage capability. For example, the configuration of the hydraulic accumulator 120 can be selected to provide a predetermined amount of backup hydraulic power for the hydraulic fluid system 100, and/or the like. In some examples, the configuration of the hydraulic accumulator 120 is selected to provide the hydraulic accumulator 120 with a greater energy storage capability than an existing hydraulic accumulator of the bootstrap hydraulic reservoir 112 that has been used solely to maintain pressure within the bootstrap chamber 114, for example to provide a greater backup hydraulic power capability than would be possible with the existing hydraulic accumulator.

The actuator 158 enables the hydraulic accumulator 120 to serve a dual purpose of maintaining pressure within the bootstrap chamber 114 and providing backup hydraulic power to the hydraulic fluid system 100. The dual use of the hydraulic accumulator 120 enables the supply of backup hydraulic power to the hydraulic fluid system 100 without the addition of a dedicated hydraulic accumulator to the hydraulic fluid system. For example, the dual use of the hydraulic accumulator 120 can enable the elimination of a dedicated hydraulic accumulator for correcting for asymmetric thrust during an engine failure, a dedicated hydraulic accumulator for opening the landing gear doors, and/or the like. Accordingly, the dual use of the hydraulic accumulator 120 reduces the weight and complexity of the hydraulic fluid system 100 and thereby increases the efficiency of the aircraft.

The valve 122 is not limited to the arrangement, configuration, components, and/or the like shown in FIG. 1. Rather, the valve 122 additionally or alternatively can include any other arrangement configuration, components, and/or the like that enables the valve 122 to provide backup and/or extra hydraulic power to the hydraulic fluid system 100, a secondary actuator (e.g., the secondary actuator 460 shown in FIG. 4, the secondary actuator 560 shown in FIG. 5, the secondary actuator 660 shown in FIG. 6, etc.) of the aircraft, and/or the like.

Figure 2:
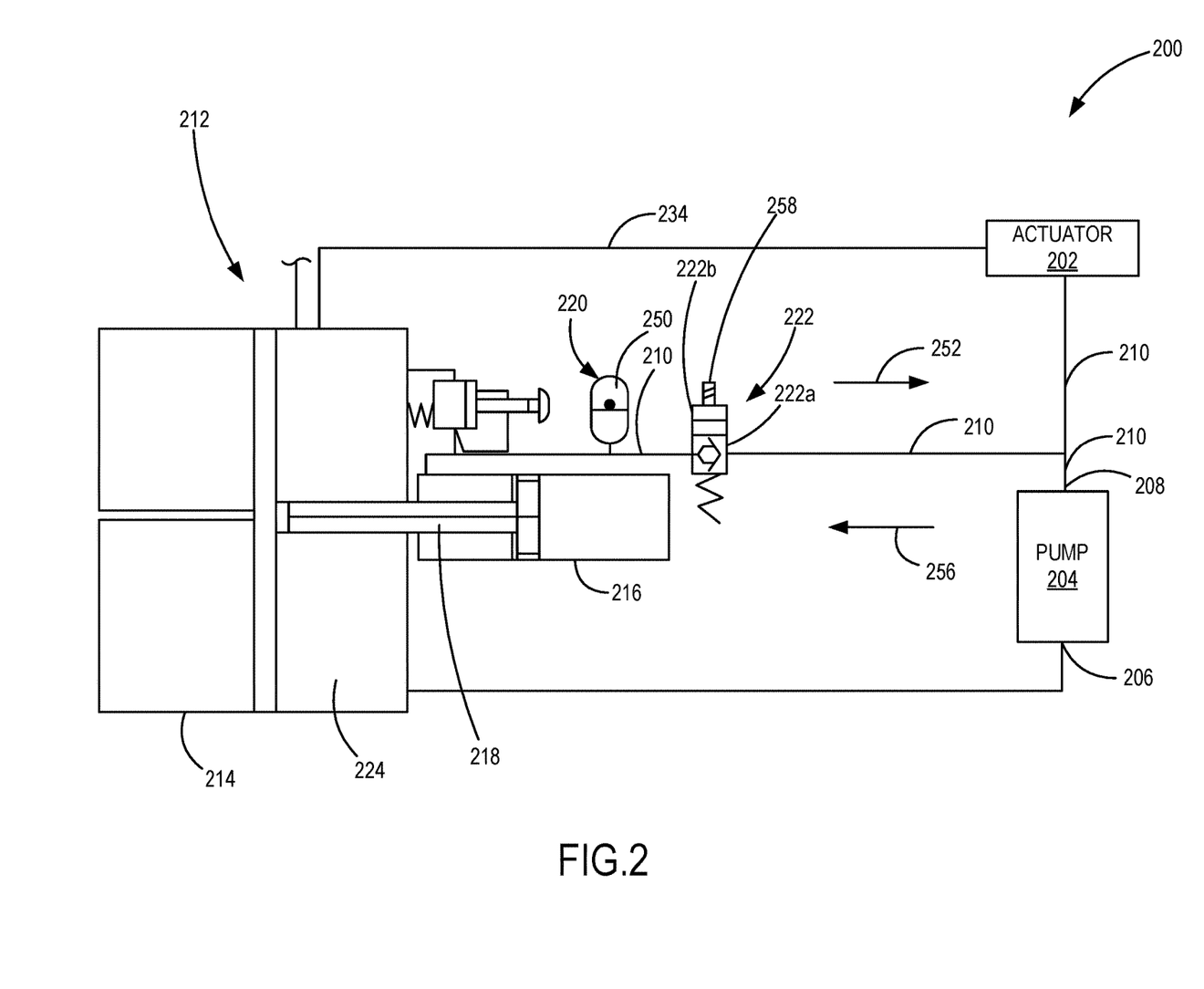
FIG. 2 is a schematic diagram of a hydraulic fluid system according to another embodiment of the present disclosure.

For example, and referring now to FIG. 2, a hydraulic fluid system 200 includes one or more hydraulic pumps 204 and one or more actuators 202. The hydraulic pump 204 includes an inlet 206 that defines a suction side of the hydraulic pump 204 and an outlet 208 that defines a pressure side of the hydraulic pump 204. The actuator 202 is fluidly connected to the outlet 208 of the hydraulic pump 204 via a pressure line 210 of the hydraulic fluid system 200. The hydraulic fluid system 200 also includes a bootstrap hydraulic reservoir 212, which includes a bootstrap chamber 214, a piston chamber 216, a piston 218, a hydraulic accumulator 220, and a valve 222.

The valve 222 is fluidly connected to the pressure line 210 between the hydraulic accumulator 220 and the outlet 208 of the hydraulic pump 204. The valve 222 includes a check valve 222a that is moveable between an open position and a closed position. The check valve 222a is biased by a spring and/or other biasing mechanism to the closed position. In the closed position, the check valve 222a prevents hydraulic fluid from flowing within the pressure line 210 through the check valve 222a in the direction of the arrow 252. During operation of the hydraulic fluid system 200 (i.e., when the pressure line 210 is pressurized), the check valve 222a is configured to be moved to the open position against the bias by pressurized hydraulic fluid flowing through the pressure line 210 in the direction of the arrow 256 toward the piston chamber 216. In the open position, the pressurized hydraulic fluid flowing within the pressure line 210 in the direction 256 during operation of the hydraulic fluid system 200 flows through the check valve 222a to the piston chamber 216 to thereby pressurize a volume of hydraulic fluid 224 contained within the bootstrap chamber 214. The closed position of the check valve 222a may be referred to herein as a "second closed position". The open position of the check valve 222a may be referred to herein as a "second open position".

The valve 222 includes an active valve 222b that is movable between an open position and a closed position. In the closed position, the active valve 222b prevents hydraulic fluid from flowing within the pressure line 210 through the active valve 222b in the direction 252. When the hydraulic fluid system 200 is operating, the open position of the active valve 222b allows pressurized hydraulic fluid flowing within the pressure line 210 in the direction 256 to flow through the active valve 222b to the piston chamber 216 to thereby pressurize the volume of hydraulic fluid 224 contained within the bootstrap chamber 214.

The active valve 222b includes an actuator 258 that is configured to selectively move the active valve 222b to the open position when the pressure line 210 is de-pressurized, for example when the pressure line 210 is de-pressurized by a failure of the hydraulic fluid system 200, a shutdown of the hydraulic fluid system 200, and/or other (e.g., emergency, etc.) situation. By opening the active valve 222b when the pressure line 210 is de-pressurized, the potential energy of an energy storage device 250 of the hydraulic accumulator 220 forces hydraulic fluid accumulated by the hydraulic accumulator 220 into the pressure line 210 such that the hydraulic accumulator 220 supplies the pressure line 210 with pressurized hydraulic fluid that flows in the direction 252 toward the outlet 208 of the hydraulic pump 204. The pressurized fluid flowing from the hydraulic accumulator 220 through the pressure line 210 in the direction 252 flows to the actuator 202. Accordingly, when the pressure line 210 is de-pressurized and the actuator 258 moves the active valve 222b to the open position, the hydraulic accumulator 220 supplies the actuator 202 with a flow of pressurized hydraulic fluid through the pressure line 210. The actuator 258 may be referred to herein as a "valve actuator". The closed position of the active valve 222b may be referred to herein as a "first closed position". The open position of the active valve 222b may be referred to herein as a "first open position".

Figure 3:
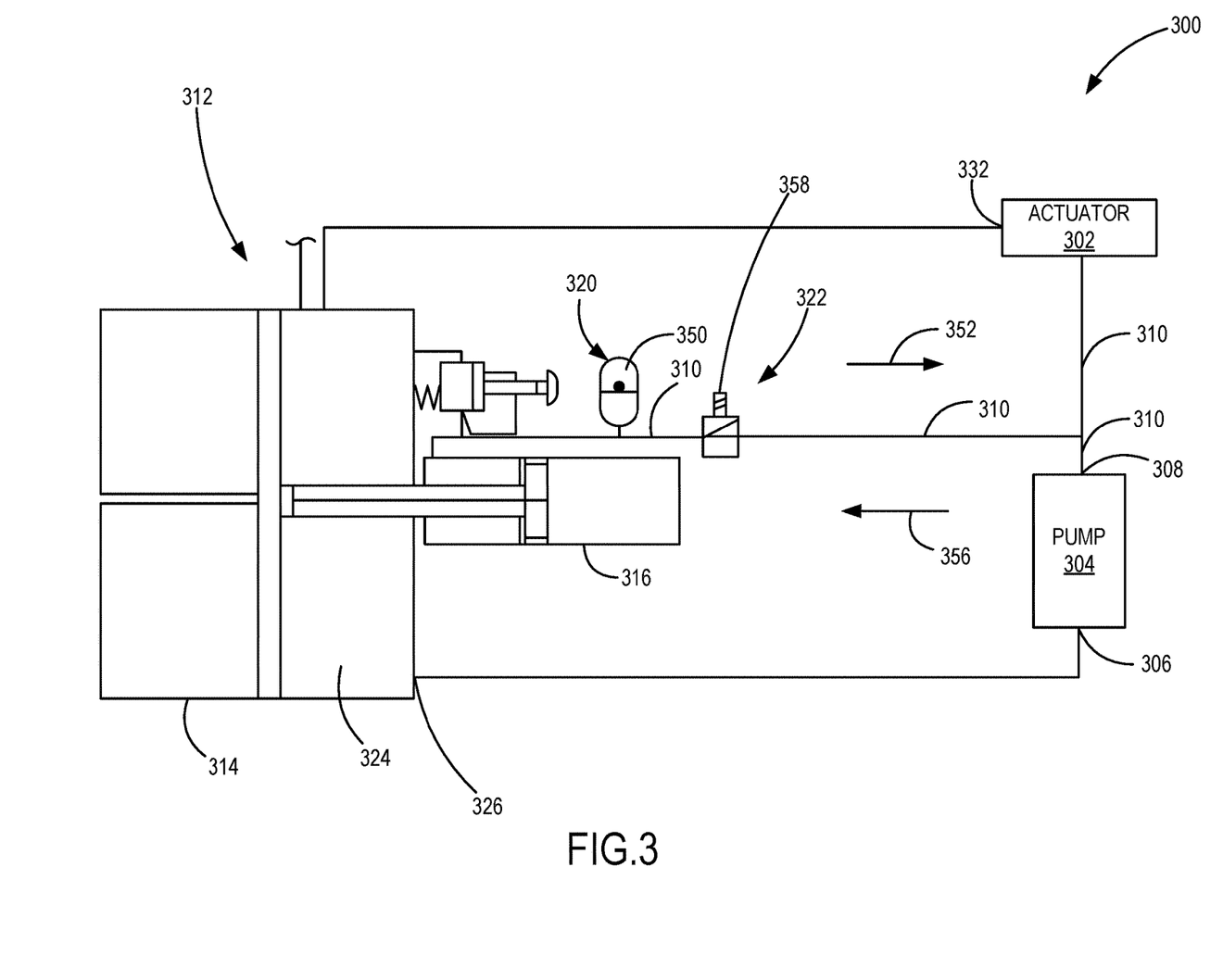
FIG. 3 is a schematic diagram of a hydraulic fluid system according to another embodiment of the present disclosure.

Referring now to FIG. 3, another configuration, arrangement, and/or the like of a valve 322 is shown. A hydraulic fluid system 300 includes one or more hydraulic pumps 304 and one or more actuators 302. The hydraulic pump 304 includes an inlet 306 that defines a suction side of the hydraulic pump 304 and an outlet 308 that defines a pressure side of the hydraulic pump 304. The actuator 302 is fluidly connected to the outlet 308 of the hydraulic pump 304 via a pressure line 310 of the hydraulic fluid system 300. The hydraulic fluid system 300 also includes a bootstrap hydraulic reservoir 312, which includes a bootstrap chamber 314, a piston chamber 316, a piston 318, a hydraulic accumulator 320, and the valve 322 (also referred to herein as an "active valve").

In the embodiment of FIG. 3, the check valve has been replaced by an active valve. The active valve 322 is fluidly connected to the pressure line 310 between the hydraulic accumulator 320 and the outlet 308 of the hydraulic pump 304. The active valve 322 is moveable between an open position and a closed position. The active valve 322 includes an actuator 358 that is configured to selectively move the active valve 322 between the open position and the closed position. In the closed position, the active valve 322 prevents hydraulic fluid from flowing within the pressure line 310 through the active valve 322 in the direction of the arrow 352. When the hydraulic fluid system 300 is operating, the open position of the active valve 322 allows pressurized hydraulic fluid flowing within the pressure line 310 in the direction of the arrow 356 to flow through the active valve 322 to the piston chamber 316 to thereby pressurize a volume of hydraulic fluid 324 contained within the bootstrap chamber 314.

The actuator 358 is configured to selectively move the active valve 322 to the open position when the pressure line 310 is de-pressurized, for example when the pressure line 310 is de-pressurized by a failure of the hydraulic fluid system 300, a shutdown of the hydraulic fluid system 300, and/or other (e.g., emergency, etc.) situation. By opening the active valve 322 when the pressure line 310 is de-pressurized, the potential energy of an energy storage device 350 of the hydraulic accumulator 320 forces hydraulic fluid accumulated by the hydraulic accumulator 320 into the pressure line 310 such that the hydraulic accumulator 320 supplies the pressure line 310 with pressurized hydraulic fluid that flows in the direction 352 toward the outlet 308 of the hydraulic pump 304. The pressurized fluid flowing from the hydraulic accumulator 320 through the pressure line 310 in the direction 352 flows to the actuator 302. Accordingly, when the pressure line 310 is de-pressurized and the actuator 358 moves the active valve 322 to the open position, the hydraulic accumulator 320 supplies the actuator 302 with a flow of pressurized hydraulic fluid through the pressure line 310. The actuator 358 may be referred to herein as a "valve actuator".

Figure 4:
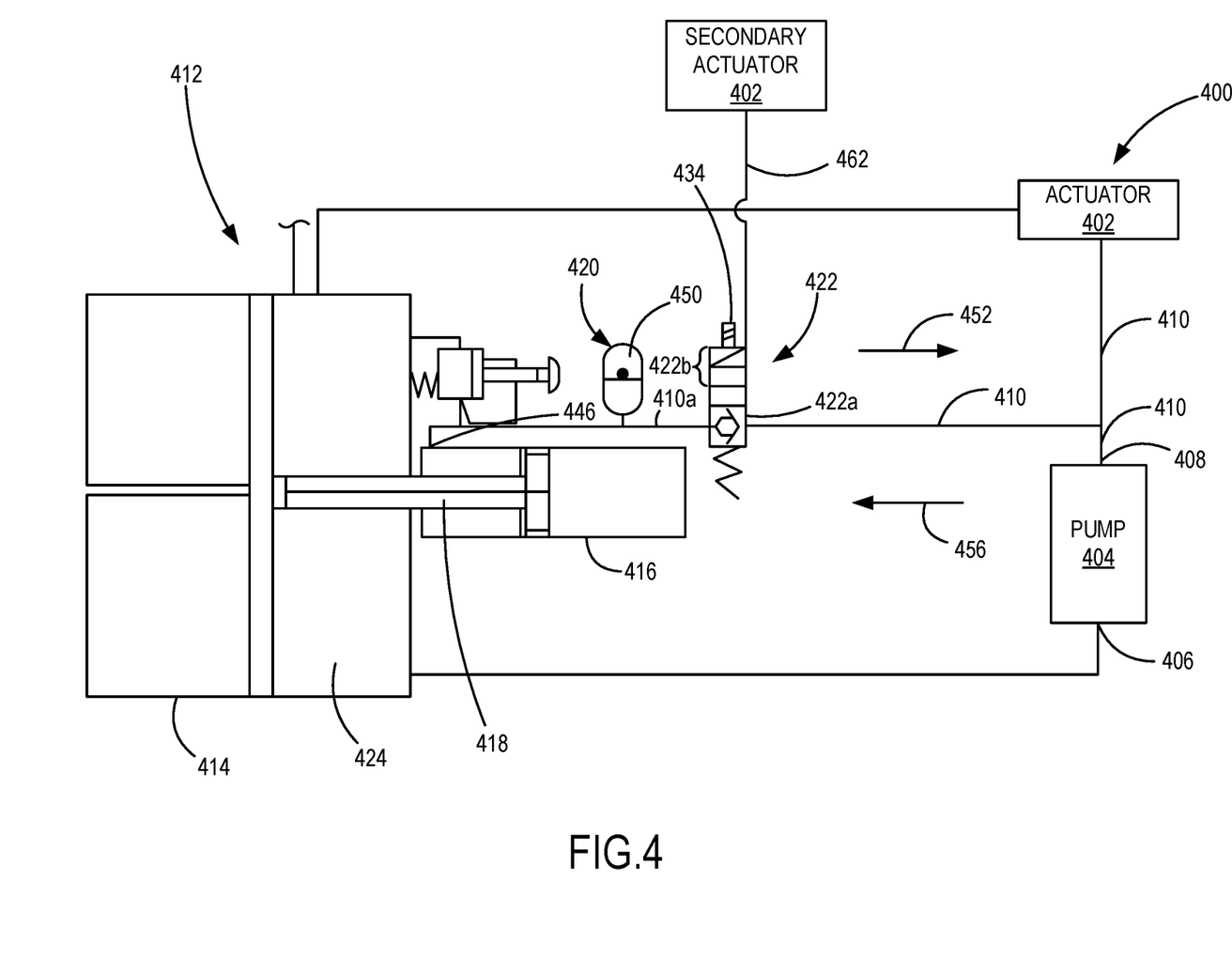
FIG. 4 is a schematic diagram of a hydraulic fluid system according to another embodiment of the present disclosure.

Referring now to FIG. 4, another configuration, arrangement, and/or the like of a valve 422 is shown. A hydraulic fluid system 400 includes one or more hydraulic pumps 404 and one or more actuators 402. The hydraulic pump 404 includes an inlet 406 that defines a suction side of the hydraulic pump 404 and an outlet 408 that defines a pressure side of the hydraulic pump 404. The actuator 402 is fluidly connected to the outlet 408 of the hydraulic pump 404 via a pressure line 410 of the hydraulic fluid system 400. The hydraulic fluid system 400 also includes a bootstrap hydraulic reservoir 412, which includes a bootstrap chamber 414, a piston chamber 416, a piston 418, a hydraulic accumulator 420, and the valve 422.

The valve 422 is fluidly connected to the pressure line 410 between the hydraulic accumulator 420 and the outlet 408 of the hydraulic pump 404. The valve 422 includes a check valve 422a that is moveable between an open position and a closed position. The check valve 422a is biased by a spring and/or other biasing mechanism to the closed position. In the closed position, the check valve 422a prevents hydraulic fluid from flowing within the pressure line 410 through the check valve 422a in the direction of the arrow 452. During operation of the hydraulic fluid system 400 (i.e., when the pressure line 410 is pressurized), the check valve 422a is configured to be moved to the open position against the bias by pressurized hydraulic fluid flowing through the pressure line 410 in the direction of the arrow 456 toward the piston chamber 416. In the open position, the pressurized hydraulic fluid flowing within the pressure line 410 in the direction 456 during operation of the hydraulic fluid system 400 flows through the check valve 422a to the piston chamber 416 to thereby pressurize a volume of hydraulic fluid 424 contained within the bootstrap chamber 414. The closed position of the check valve 422a may be referred to herein as a "second closed position". The open position of the check valve 422a may be referred to herein as a "third open position".

The valve 422 includes an active valve 422b that includes an actuator 458 that is configured to move the active valve 422b between a closed position and first and second open positions of the active valve 422b. In the closed position, the active valve 422b prevents hydraulic fluid from flowing within the pressure line 410 through the active valve 422b in the direction 452. When the hydraulic fluid system 400 is operating, the first open position of the active valve 422b allows pressurized hydraulic fluid flowing within the pressure line 410 in the direction 456 to flow through the active valve 422b to the piston chamber 416 to thereby pressurize the volume of hydraulic fluid 424 contained within the bootstrap chamber 414.

The actuator 458 of the active valve 422b is configured to selectively move the active valve 422b to the first open position when the pressure line 410 is de-pressurized, for example when the pressure line 410 is de-pressurized by a failure of the hydraulic fluid system 400, a shutdown of the hydraulic fluid system 400, and/or other (e.g., emergency, etc.) situation. By opening the active valve 422b to the first open position when the pressure line 410 is de-pressurized, the potential energy of an energy storage device 450 of the hydraulic accumulator 420 forces hydraulic fluid accumulated by the hydraulic accumulator 420 into the pressure line 410 such that the hydraulic accumulator 420 supplies the pressure line 410 with pressurized hydraulic fluid that flows in the direction 452 toward the outlet 408 of the hydraulic pump 404. The pressurized fluid flowing from the hydraulic accumulator 420 through the pressure line 410 in the direction 452 flows to the actuator 402. Accordingly, when the pressure line 410 is de-pressurized and the actuator 458 moves the active valve 422b to the first open position, the hydraulic accumulator 420 supplies the actuator 402 with a flow of pressurized hydraulic fluid through the pressure line 410. The actuator 458 may be referred to herein as a "valve actuator". The closed position of the active valve 422*b* may be referred to herein as a "first closed position".

As shown in FIG. 4, the active valve 422*b* is fluidly connected to a secondary actuator 460 of the aircraft through a secondary hydraulic line 462. The secondary actuator 460 and the secondary hydraulic line 462 are contained within a separate hydraulic fluid circuit from the hydraulic fluid system 400 (i.e., are not contained with the hydraulic fluid system 400). The secondary actuator 460 can be used to control any device of the aircraft, such as, but not limited to, a door, a vent, and/or the like.

The second open position of the active valve 422*b* fluidly connects the secondary actuator 460 to the hydraulic accumulator 420 via the secondary line 462 and a segment 410*a* of the pressure line 410 that extends between hydraulic accumulator 420 and the active valve 422*b*. In the closed position, the active valve 422*b* prevents hydraulic fluid from flowing from the hydraulic accumulator 420 to the secondary actuator 460 through the pressure line segment 410*a*, the active valve 422*b*, and the secondary line 462.

The actuator 458 of the active valve 422*b* is configured to selectively move the active valve 422*b* to the second open position when the pressure line 410 is de-pressurized, for example when the pressure line 410 is de-pressurized by a failure of the hydraulic fluid system 400, a shutdown of the hydraulic fluid system 400, and/or other (e.g., emergency, etc.) situation. By opening the active valve 422*b* to the second open position when the pressure line 410 is de-pressurized, the potential energy of the energy storage device 450 of the hydraulic accumulator 420 forces hydraulic fluid accumulated by the hydraulic accumulator 420 into the pressure line segment 410*a* such that pressurized fluid flows from the hydraulic accumulator 420 through the pressure line segment 410*a*, the active valve 422*b*, and the secondary line 462 to the secondary actuator 460. Accordingly, when the pressure line 410 is de-pressurized and the actuator 458 moves the active valve 422*b* to the second open position, the hydraulic accumulator 420 supplies the secondary actuator 460 with a flow of pressurized hydraulic fluid. The hydraulic accumulator 420 thus is configured to provide extra hydraulic power that drives operation of the secondary actuator 460 (e.g., when the secondary actuator 460 is not fluidly connected to a hydraulic pump to drive operation thereof, etc.). In some examples, the hydraulic accumulator 420 provides backup hydraulic power to the secondary actuator 460, for example when a hydraulic pump (not shown) that drives operation of the secondary actuator 460 is inoperable, and/or the like. The secondary actuator 460 may be referred to herein as a "secondary device actuator".

Figure 5:
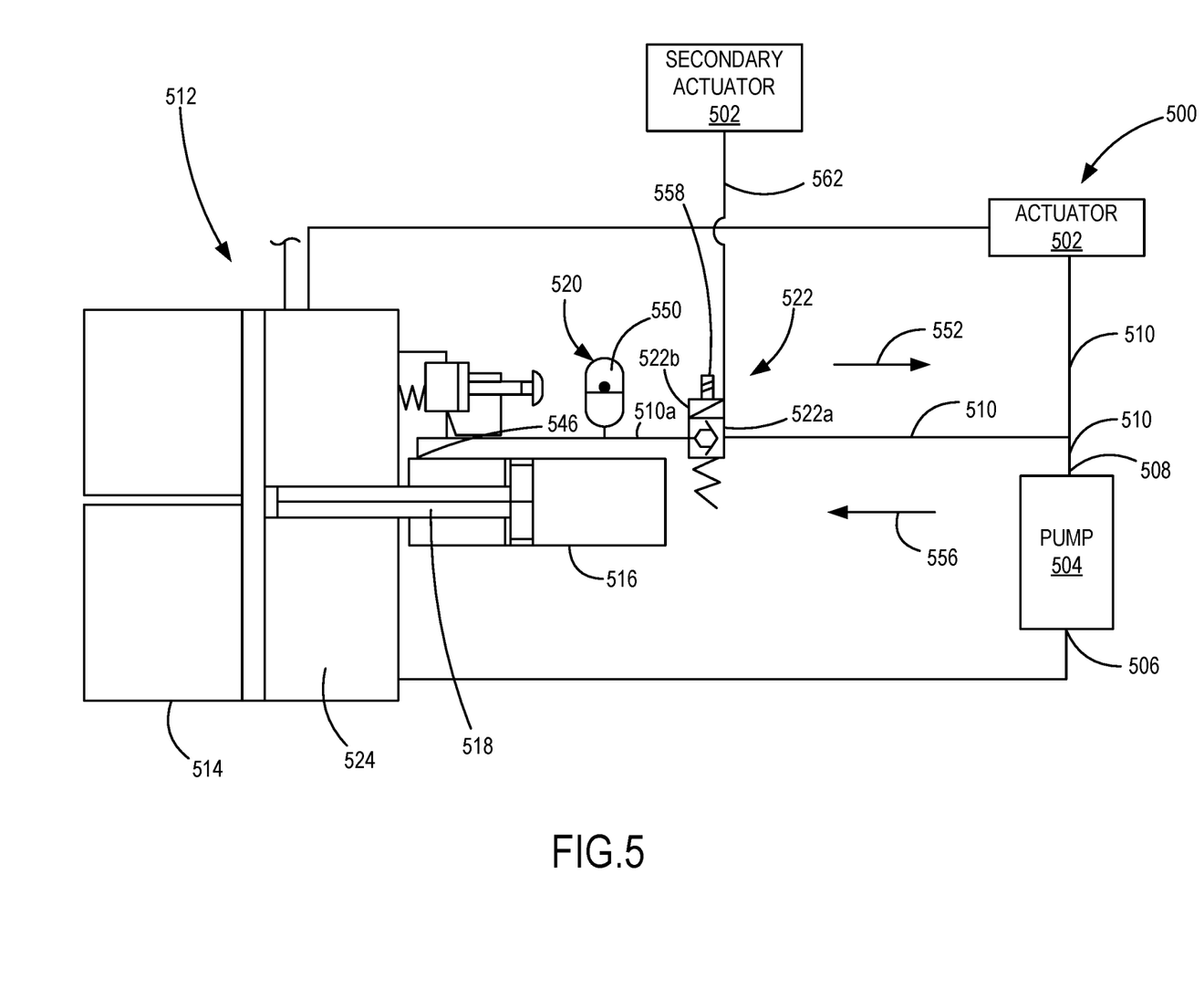
FIG. 5 is a schematic diagram of a hydraulic fluid system according to yet another embodiment of the present disclosure.

Referring now to FIG. 5, another configuration, arrangement, and/or the like of a valve 522 is shown. A hydraulic fluid system 500 includes one or more hydraulic pumps 504 and one or more actuators 502. The hydraulic pump 504 includes an inlet 506 that defines a suction side of the hydraulic pump 504 and an outlet 508 that defines a pressure side of the hydraulic pump 504. The actuator 502 is fluidly connected to the outlet 508 of the hydraulic pump 504 via a pressure line 510 of the hydraulic fluid system 500. The hydraulic fluid system 500 also includes a bootstrap hydraulic reservoir 512, which includes a bootstrap chamber 514, a piston chamber 516, a piston 518, a hydraulic accumulator 520, and the valve 522.

The valve 522 is fluidly connected to the pressure line 510 between the hydraulic accumulator 520 and the outlet 508 of the hydraulic pump 504. The valve 522 includes a check valve 522*a* that is moveable between an open position and a closed position. The check valve 522*a* is biased by a spring and/or other biasing mechanism to the closed position. In the closed position, the check valve 522*a* prevents hydraulic fluid from flowing within the pressure line 510 through the check valve 522*a* in the direction of the arrow 552. During operation of the hydraulic fluid system 500 (i.e., when the pressure line 510 is pressurized), the check valve 522*a* is configured to be moved to the open position against the bias by pressurized hydraulic fluid flowing through the pressure line 510 in the direction of the arrow 556 toward the piston chamber 516. In the open position, the pressurized hydraulic fluid flowing within the pressure line 510 in the direction 556 during operation of the hydraulic fluid system 500 flows through the check valve 522*a* to the piston chamber 516 to thereby pressurize a volume of hydraulic fluid 524 contained within the bootstrap chamber 514. The open position of the check valve 522*a* may be referred to herein as a "first open position".

The valve 522 includes an actuator 558 that is configured to selectively move the check valve 522*a* to the open position (against the bias of the check valve 522*a* to the closed position) when the pressure line 510 is de-pressurized, for example when the pressure line 510 is de-pressurized by a failure of the hydraulic fluid system 500, a shutdown of the hydraulic fluid system 500, and/or other (e.g., emergency, etc.) situation. By opening the check valve 522*a* when the pressure line 510 is de-pressurized, the potential energy of an energy storage device 550 of the hydraulic accumulator 520 forces the hydraulic fluid accumulated by the hydraulic accumulator 520 into the pressure line 510 such that the hydraulic accumulator 520 supplies the pressure line 510 with pressurized hydraulic fluid that flows in the direction 552 toward the outlet 508 of the hydraulic pump 504. The pressurized fluid flowing from the hydraulic accumulator 520 through the pressure line 510 in the direction 552 flows to the actuator 502. Accordingly, when the pressure line 510 is de-pressurized and the actuator 558 moves the check valve 522*a* to the open position, the hydraulic accumulator 520 supplies the actuator 502 with a flow of pressurized hydraulic fluid through the pressure line 510. The actuator 558 may be referred to herein as a "valve actuator".

The valve 522 includes an active valve 522*b* that is configured to move between a closed position and an open position. The active valve 522*b* is fluidly connected to a secondary actuator 560 of the aircraft through a secondary hydraulic line 562. The secondary actuator 560 and the secondary hydraulic line 562 are contained within a separate hydraulic fluid circuit from the hydraulic fluid system 500 (i.e., are not contained with the hydraulic fluid system 500). The secondary actuator 560 can be used to control any device of the aircraft, such as, but not limited to, a door, a vent, and/or the like.

The open position of the active valve 522*b* fluidly connects the secondary actuator 560 to the hydraulic accumulator 520 via the secondary line 562 and a segment 510*a* of the pressure line 510 that extends between hydraulic accumulator 520 and the active valve 522*b*. In the closed position, the active valve 522*b* prevents hydraulic fluid from flowing from the hydraulic accumulator 520 to the secondary actuator 560 through the pressure line segment 510*a*, the active valve 522*b*, and the secondary line 562. The open position of the active valve 522*b* may be referred to herein as a "second open position".

The actuator 558 of the valve 522 is configured to selectively move the active valve 522*b* to the open position when the pressure line 510 is de-pressurized, for example when the pressure line 510 is de-pressurized by a failure of the hydraulic fluid system 500, a shutdown of the hydraulic fluid system 500, and/or other (e.g., emergency, etc.) situation. By opening the active valve 522*b* to the open position when the pressure line 510 is de-pressurized, the potential energy of the energy storage device 550 of the hydraulic accumulator 520 forces hydraulic fluid from the hydraulic accumulator 520 into the pressure line segment 510*a* such that pressurized fluid flows from the hydraulic accumulator 520 through the pressure line segment 510*a*, the active valve 522*b*, and the secondary line 562 to the secondary actuator 560. Accordingly, when the pressure line 510 is de-pressurized and the actuator 558 moves the active valve 522*b* to the open position thereof, the hydraulic accumulator 520 supplies the secondary actuator 560 with a flow of pressurized hydraulic fluid. The hydraulic accumulator 520 thus is configured to provide extra hydraulic power that drives operation of the secondary actuator 560 (e.g., when the secondary actuator 560 is not fluidly connected to a hydraulic pump to drive operation thereof, etc.). In some examples, the hydraulic accumulator 520 provides backup hydraulic power to the secondary actuator 560, for example when a hydraulic pump (not shown) that drives operation of the secondary actuator 560 is inoperable, and/or the like. The secondary actuator 560 may be referred to herein as a "secondary device actuator".

Figure 6:
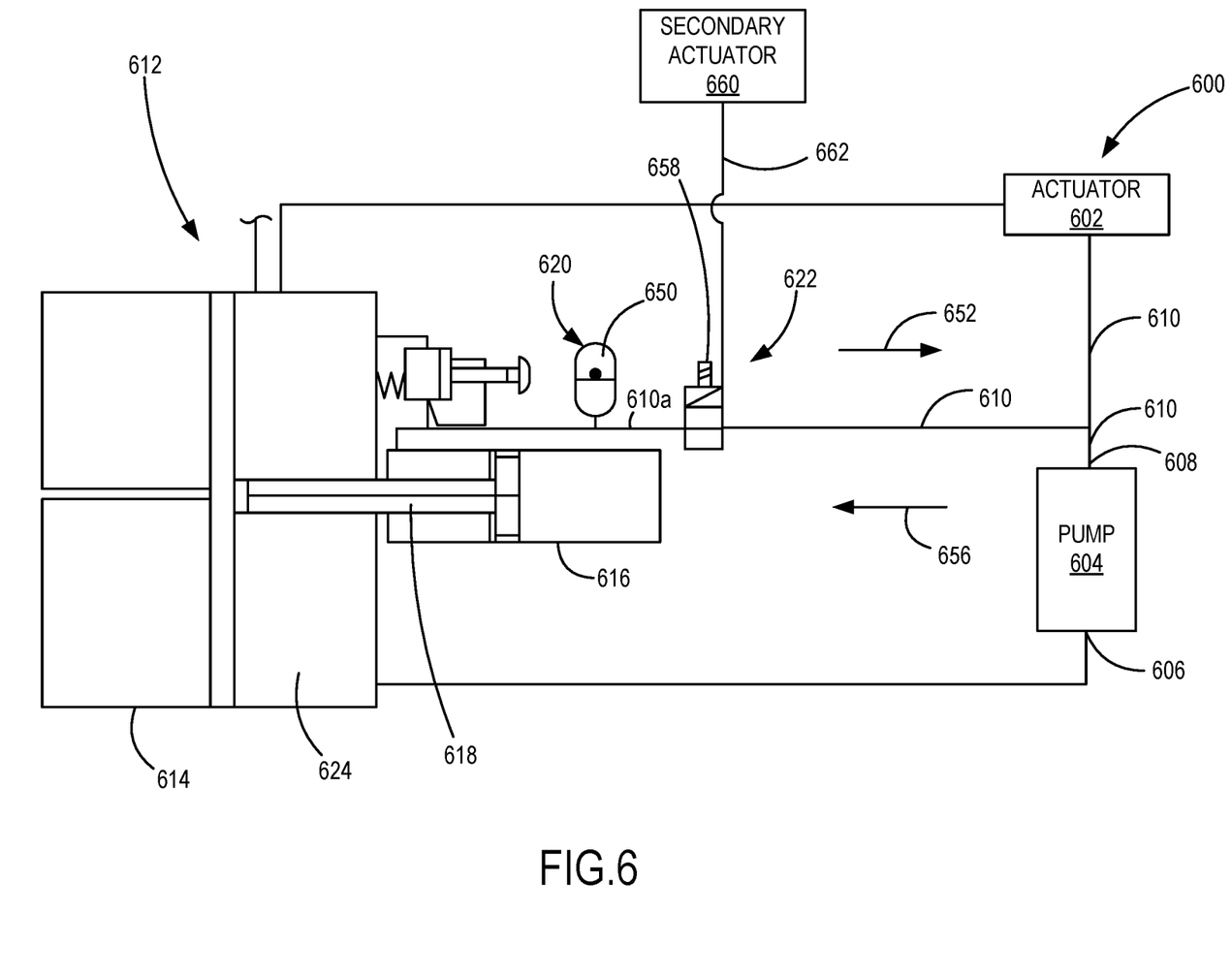
FIG. 6 is a schematic diagram of a hydraulic fluid system according to still another embodiment of the present disclosure.

Referring now to FIG. 6, another configuration, arrangement, and/or the like of a valve 622 is shown. A hydraulic fluid system 600 includes one or more hydraulic pumps 604 and one or more actuators 602. The hydraulic pump 604 includes an inlet 606 that defines a suction side of the hydraulic pump 604 and an outlet 608 that defines a pressure side of the hydraulic pump 604. The actuator 602 is fluidly connected to the outlet 608 of the hydraulic pump 604 via a pressure line 610 of the hydraulic fluid system 600. The hydraulic fluid system 600 also includes a bootstrap hydraulic reservoir 612, which includes a bootstrap chamber 614, a piston chamber 616, a piston 618, a hydraulic accumulator 620, and the valve 622.

In the embodiment of FIG. 6, the check valve has been replaced by an active valve. The active valve 622 is fluidly connected to the pressure line 610 between the hydraulic accumulator 620 and the outlet 608 of the hydraulic pump 604. The active valve 622 is moveable between a closed position and first and second open positions. The active valve 622 includes an actuator 658 that is configured to selectively move the active valve 622 between the closed position and the first and second open positions. In the closed position, the active valve 622 prevents hydraulic fluid from flowing within the pressure line 610 through the active valve 622 in the direction of the arrow 652. When the hydraulic fluid system 600 is operating, the open position of the active valve 622 allows pressurized hydraulic fluid flowing within the pressure line 610 in the direction of the arrow 656 to flow through the active valve 622 to the piston chamber 616 to thereby pressurize a volume of hydraulic fluid 624 contained within the bootstrap chamber 614. The actuator 658 may be referred to herein as a "valve actuator".

The actuator 658 is configured to selectively move the active valve 622 to the first open position when the pressure line 610 is de-pressurized, for example when the pressure line 610 is de-pressurized by a failure of the hydraulic fluid system 600, a shutdown of the hydraulic fluid system 600, and/or other (e.g., emergency, etc.) situation. By opening the active valve 622 to the first open position when the pressure line 610 is de-pressurized, the potential energy of an energy storage device 650 of the hydraulic accumulator 620 forces hydraulic fluid accumulated from the hydraulic accumulator 620 into the pressure line 610 such that the hydraulic accumulator 620 supplies the pressure line 610 with pressurized hydraulic fluid that flows in the direction 652 toward the outlet 608 of the hydraulic pump 604. The pressurized fluid flowing from the hydraulic accumulator 620 through the pressure line 610 in the direction 652 flows to the actuator 602. Accordingly, when the pressure line 610 is de-pressurized and the actuator 658 moves the active valve 622 to the first open position, the hydraulic accumulator 620 supplies the actuator 602 with a flow of pressurized hydraulic fluid through the pressure line 610.

The active valve 622 is fluidly connected to a secondary actuator 660 of the aircraft through a secondary hydraulic line 662, as is shown in FIG. 6. The secondary actuator 660 and the secondary hydraulic line 662 are contained within a separate hydraulic fluid circuit from the hydraulic fluid system 600 (i.e., are not contained with the hydraulic fluid system 600). The secondary actuator 660 can be used to control any device of the aircraft, such as, but not limited to, a door, a vent, and/or the like. The secondary actuator 460 may be referred to herein as a "secondary device actuator".

The second open position of the active valve 622 fluidly connects the secondary actuator 660 to the hydraulic accumulator 620 via the secondary line 662 and a segment 610*a* of the pressure line 610 that extends between hydraulic accumulator 620 and the active valve 622. In the closed position, the active valve 622 prevents hydraulic fluid from flowing from the hydraulic accumulator 620 to the secondary actuator 660 through the pressure line segment 610*a*, the active valve 622, and the secondary line 662.

The actuator 658 of the active valve 622 is configured to selectively move the active valve 622 to the second open position. By opening the active valve 622 to the second open position, the potential energy of the energy storage device 650 of the hydraulic accumulator 620 forces hydraulic fluid from the hydraulic accumulator 620 into the pressure line segment 610*a* such that pressurized fluid flows from the hydraulic accumulator 620 to the secondary actuator 660 through the pressure line segment 610*a*, the active valve 622*b*, and the secondary line 662. Accordingly, when the actuator 658 moves the active valve 622 to the second open position, the hydraulic accumulator 620 supplies the secondary actuator 660 with a flow of pressurized hydraulic fluid. The hydraulic accumulator 620 thus is configured to provide extra hydraulic power that drives operation of the secondary actuator 660 (e.g., when the secondary actuator 660 is not fluidly connected to a hydraulic pump to drive operation thereof, etc.). In some examples, the hydraulic accumulator 620 provides backup hydraulic power to the secondary actuator 660, for example when a hydraulic pump (not shown) that drives operation of the secondary actuator 660 is inoperable, and/or the like. It should be appreciated that the embodiment of FIG. 6 enables the hydraulic accumulator 620 to supply the secondary actuator 660 with hydraulic power when the hydraulic fluid system 600 is operational (i.e., when the pressure line 610 is pressurized) via the isolation of the pressure line segment 610*a* from the remainder of the hydraulic fluid system 600 in the closed position of the active valve 622.

Figure 7:
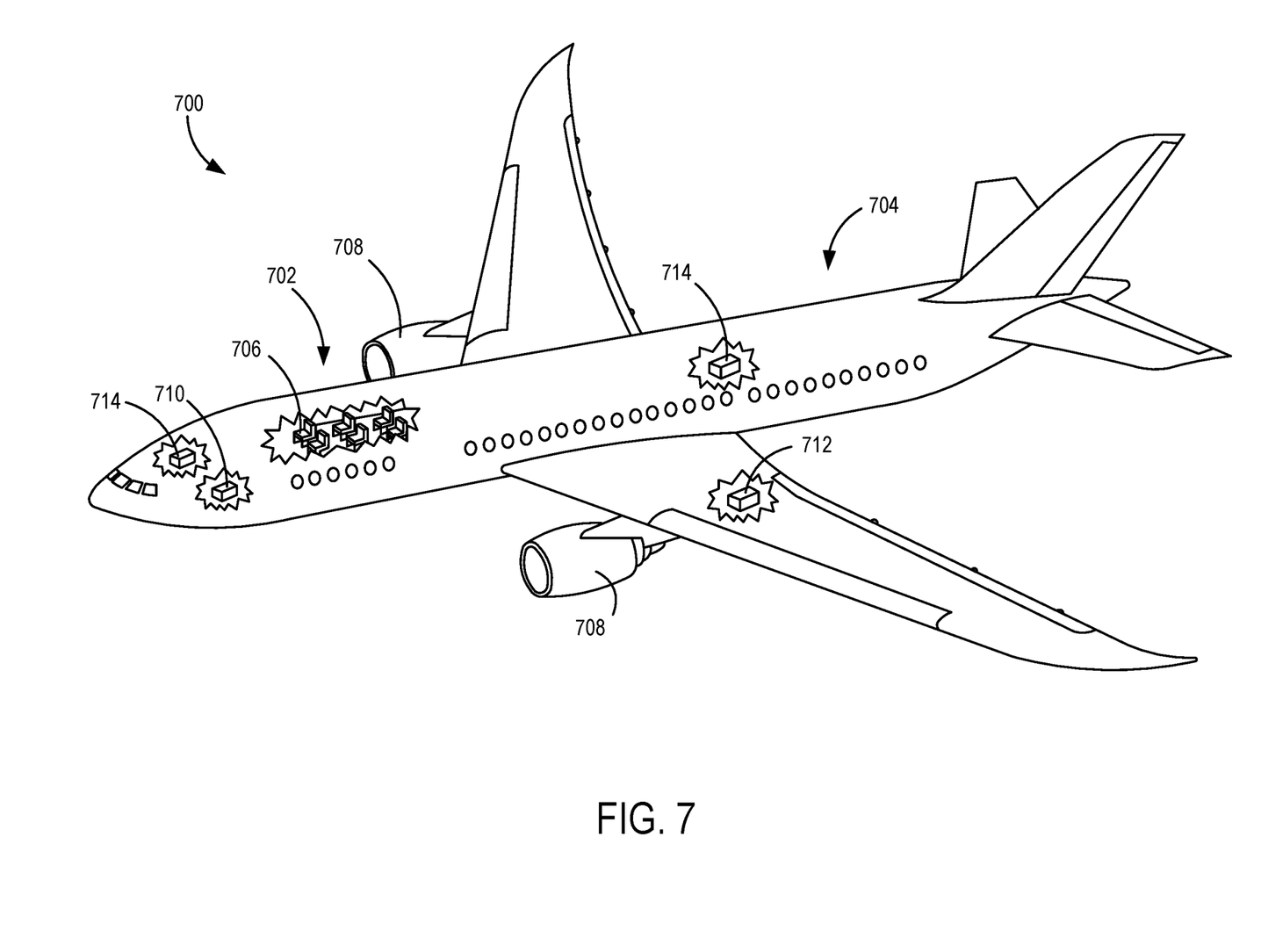
FIG. 7 is a schematic perspective view of an aircraft.

Referring now to FIG. 7, examples of the disclosure may be described in the context of an aircraft 700 that can include an airframe 702 with a plurality of high-level systems 704 and an interior 706. Examples of high-level systems 704 include one or more of a propulsion system 708, an electrical system 710, a hydraulic fluid system 712, a control system 714, and an environmental system 716. Any number of other systems can be included. Although an aerospace example is shown, the principles can be applied to other industries, such as, but not limited to, the automotive industry, the marine industry, and/or the like.

Thus, various embodiments include a hydraulic accumulator configured to serve a dual purpose of maintaining pressure within a bootstrap chamber and providing backup hydraulic power to a hydraulic fluid system. The dual use of the hydraulic accumulator enables the supply of backup hydraulic power to a hydraulic fluid system without the addition of a dedicated hydraulic accumulator to the hydraulic fluid system. Accordingly, the dual use of the hydraulic accumulator reduces the weight and complexity of the hydraulic fluid system and thereby increases the efficiency of an aircraft that includes the hydraulic fluid system.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute means for dual use of an hydraulic accumulator.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The following clauses describe further aspects:

Clause Set A:

A1. A bootstrap hydraulic reservoir for a hydraulic fluid system, the bootstrap hydraulic reservoir comprising:
a bootstrap chamber to hold hydraulic fluid;
a piston chamber fluidly connected to a pressure line of the hydraulic fluid system;
a piston comprising a bootstrap end portion held within the bootstrap chamber and a pressure end portion held within the piston chamber;
a hydraulic accumulator fluidly connected to the pressure line of the hydraulic fluid system such that the hydraulic accumulator is configured to accumulate pressurized hydraulic fluid from the pressure line; and a valve fluidly connected to the pressure line of the hydraulic fluid system between the hydraulic accumulator and an outlet of a pump of the hydraulic fluid system, the valve comprising a closed position, wherein the valve comprises an actuator to selectively move the valve to an open position when the pressure line of the hydraulic fluid system is de-pressurized.

A2. The bootstrap hydraulic reservoir of clause A1, wherein the hydraulic accumulator supplies the pressure line of the hydraulic fluid system with a flow of pressurized hydraulic fluid toward the outlet of the pump of the hydraulic fluid system when the pressure line is de-pressurized and the actuator moves the valve to the open position.

A3. The bootstrap hydraulic reservoir of clause A1, wherein the actuator is a valve actuator, the hydraulic accumulator supplies a device actuator of the hydraulic fluid system with a flow of pressurized hydraulic fluid through the pressure line of the hydraulic fluid system when the pressure line is de-pressurized and the valve actuator moves the valve to the open position.

A4. The bootstrap hydraulic reservoir of clause A1, wherein the valve is a check valve that is biased to the closed position, the actuator selectively moves the valve to the open position against the bias, and the valve is moved to the open position against the bias by pressurized hydraulic fluid flowing through the pressure line toward the piston chamber.

A5. The bootstrap hydraulic reservoir of clause A1, wherein the valve is an active valve, the open position is a first open position, and the closed position is a first closed position, the bootstrap hydraulic reservoir further comprising a check valve fluidly connected to the pressure line of the hydraulic fluid system between the hydraulic accumulator and the outlet of the pump of the hydraulic fluid system, the check valve being biased to a second closed position, the check valve moves to a second open position against the bias by pressurized hydraulic fluid flowing through the pressure line toward the piston chamber.

A6. The bootstrap hydraulic reservoir of clause A1, wherein the actuator is a valve actuator and the open position is a first open position, the valve being fluidly connected to a secondary device actuator, the valve comprising a second open position wherein the hydraulic accumulator supplies a flow of pressurized hydraulic fluid to the secondary device actuator.

A7. The bootstrap hydraulic reservoir of clause A1, wherein the valve is an active valve, the actuator is a valve actuator, the open position is a first open position, and the closed position is a first closed position, the active valve being fluidly connected to a secondary device actuator, the active valve comprising a second open position wherein the hydraulic accumulator supplies a flow of pressurized hydraulic fluid to the secondary device actuator when the pressure line is de-pressurized, the bootstrap hydraulic reservoir further comprising a check valve fluidly connected to the pressure line of the hydraulic fluid system between the hydraulic accumulator and the outlet of the pump of the hydraulic fluid system, the check valve being biased to a second closed position, the check valve moves to a third open position against the bias by pressurized hydraulic fluid flowing through the pressure line toward the piston chamber.

A8. The bootstrap hydraulic reservoir of clause A1, wherein the actuator comprises a solenoid.

Clause Set B:

B1. A hydraulic fluid system comprising:
a hydraulic pump comprising an inlet and an outlet;
a pressure line;
a device actuator fluidly connected to the outlet of the hydraulic pump via the pressure line; and
a bootstrap hydraulic reservoir comprising:
a bootstrap chamber to hold hydraulic fluid;
a piston chamber fluidly connected to the pressure line;
a piston comprising a bootstrap end portion held within the bootstrap chamber and a pressure end portion held within the piston chamber;
a hydraulic accumulator fluidly connected to the pressure line such that the hydraulic accumulator is configured to accumulate pressurized hydraulic fluid from the pressure line; and
a valve fluidly connected to the pressure line between the hydraulic accumulator and the outlet of the pump, the valve comprising a closed position, wherein the valve comprises a valve actuator to selectively move the valve to an open position when the pressure line is de-pressurized.

B2. The hydraulic fluid system of clause B1, wherein the hydraulic accumulator supplies the pressure line of the hydraulic fluid system with a flow of pressurized hydraulic fluid toward the outlet of the pump of the hydraulic fluid system when the pressure line is de-pressurized and the valve actuator moves the valve to the open position.

B3. The hydraulic fluid system of clause B1, wherein the hydraulic accumulator supplies the device actuator with a flow of pressurized hydraulic fluid through the pressure line when the pressure line is de-pressurized and the valve actuator moves the valve to the open position.

B4. The hydraulic fluid system of clause B1, wherein the valve is a check valve that is biased to the closed position, the valve actuator selectively moves the valve to the open position against the bias, and the valve moves to the open position against the bias by pressurized hydraulic fluid flowing through the pressure line toward the piston chamber.

B5. The hydraulic fluid system of clause B1, wherein the valve is an active valve, the open position is a first open position, and the closed position is a first closed position, the bootstrap hydraulic reservoir further comprising a check valve fluidly connected to the pressure line between the hydraulic accumulator and the outlet of the pump, the check valve being biased to a second closed position, the check valve moves to a second open position against the bias by pressurized hydraulic fluid flowing through the pressure line toward the piston chamber.

B6. The hydraulic fluid system of clause B1, wherein the open position is a first open position, the valve being fluidly connected to secondary device actuator, the valve comprising a second open position wherein the hydraulic accumulator supplies a flow of pressurized hydraulic fluid to the secondary device actuator.

B7. The hydraulic fluid system of clause B1, wherein the valve is an active valve, the open position is a first open position, and the closed position is a first closed position, the active valve being fluidly connected to a secondary device actuator, the active valve comprising a second open position wherein the hydraulic accumulator supplies a flow of pressurized hydraulic fluid to the secondary device actuator when the pressure line is de-pressurized, the bootstrap hydraulic reservoir further comprising a check valve fluidly connected to the pressure line between the hydraulic accumulator and the outlet of the pump, the check valve being biased to a second closed position, the check valve moves to a third open position against the bias by pressurized hydraulic fluid flowing through the pressure line toward the piston chamber.

B8. The hydraulic fluid system of clause B1, wherein the valve actuator comprises a solenoid.

Clause Set C:

C1. A bootstrap hydraulic reservoir for a hydraulic fluid system, the bootstrap hydraulic reservoir comprising:
- a bootstrap chamber to hold hydraulic fluid;
- a piston chamber fluidly connected to a pressure line of the hydraulic fluid system;
- a piston comprising a bootstrap end portion held within the bootstrap chamber and a pressure end portion held within the piston chamber;
- a hydraulic accumulator fluidly connected to the pressure line of the hydraulic fluid system such that the hydraulic accumulator is configured to accumulate pressurized hydraulic fluid from the pressure line; and
- a check valve fluidly connected to the pressure line of the hydraulic fluid system between the hydraulic accumulator and an outlet of a pump of the hydraulic fluid system, the check valve being biased to a closed position wherein the hydraulic accumulator supplies pressurized hydraulic fluid to the piston chamber, wherein the check valve comprises an actuator to selectively move the check valve against the bias to an open position when the pressure line of the hydraulic fluid system is de-pressurized.

C2. The bootstrap hydraulic reservoir of clause C1, wherein the hydraulic accumulator supplies the pressure line of the hydraulic fluid system with a flow of pressurized hydraulic fluid toward the outlet of the pump of the hydraulic fluid system when the pressure line is de-pressurized and the actuator selectively moves the check valve to the open position.

C3. The bootstrap hydraulic reservoir of clause C1, wherein the actuator is a valve actuator, the hydraulic accumulator supplies a device actuator of the hydraulic fluid system with a flow of pressurized hydraulic fluid through the pressure line of the hydraulic fluid system when the pressure line is de-pressurized and the valve actuator moves the valve to the open position.

C4. The bootstrap hydraulic reservoir of clause C1, wherein the actuator is a valve actuator and the open position is a first open position, the bootstrap hydraulic reservoir further comprising an active valve fluidly connected to a secondary device actuator, the active valve comprising a second open position wherein the hydraulic accumulator supplies a flow of pressurized hydraulic fluid to the device secondary actuator when the pressure line is de-pressurized.

What is claimed is:

1. A bootstrap hydraulic reservoir for a hydraulic fluid system, the bootstrap hydraulic reservoir comprising:
   - a bootstrap chamber to hold hydraulic fluid;
   - a piston chamber fluidly connected to a pressure line of the hydraulic fluid system;
   - a piston comprising a bootstrap end portion held within the bootstrap chamber and a pressure end portion held within the piston chamber;
   - a hydraulic accumulator fluidly connected to the pressure line of the hydraulic fluid system such that the hydraulic accumulator is configured to accumulate pressurized hydraulic fluid from the pressure line during operation of the hydraulic fluid system; and
   - a valve fluidly connected to the pressure line of the hydraulic fluid system between the hydraulic accumulator and an outlet of a pump of the hydraulic fluid system, the valve comprising a closed position, the valve comprising a valve actuator to selectively move the valve to an open position when the pressure line of the hydraulic fluid system is de-pressurized as a result of the hydraulic fluid system being shut down to enable the hydraulic accumulator to supply a device actuator of the hydraulic fluid system that is fluidly connected to the outlet of the pump with a flow of pressurized hydraulic fluid through the pressure line of the hydraulic fluid system.

2. The bootstrap hydraulic reservoir of claim 1, wherein the hydraulic accumulator supplies the pressure line of the hydraulic fluid system with a flow of pressurized hydraulic fluid toward the outlet of the pump of the hydraulic fluid system when the pressure line is de-pressurized and the valve actuator moves the valve to the open position.

3. The bootstrap hydraulic reservoir of claim 1, wherein the hydraulic accumulator, the piston chamber, and the pump are each fluidly connected to the pressure line of the hydraulic fluid system, and wherein the hydraulic accumulator is between the piston chamber and the pump.

4. The bootstrap hydraulic reservoir of claim 3, wherein the valve is a check valve that is biased to the closed position, the valve actuator selectively moves the valve to the open position against the bias, and the valve moves to the open position against the bias by pressurized hydraulic fluid flowing through the pressure line toward the piston chamber.

5. The bootstrap hydraulic reservoir of claim 1, wherein the valve is an active valve, the open position is a first open position, and the closed position is a first closed position, the bootstrap hydraulic reservoir further comprising a check valve fluidly connected to the pressure line of the hydraulic fluid system between the hydraulic accumulator and the outlet of the pump of the hydraulic fluid system, the check valve being biased to a second closed position, the check valve moving to a second open position against the bias by pressurized hydraulic fluid flowing through the pressure line toward the piston chamber.

6. The bootstrap hydraulic reservoir of claim 1, wherein the open position is a first open position, the valve being fluidly connected to a secondary device actuator, the valve comprising a second open position wherein the hydraulic accumulator supplies a flow of pressurized hydraulic fluid to the secondary device actuator.

7. The bootstrap hydraulic reservoir of claim 1, wherein the valve is an active valve, the open position is a first open position, and the closed position is a first closed position, the active valve being fluidly connected to a secondary device actuator, the active valve comprising a second open position wherein the hydraulic accumulator supplies a flow of pressurized hydraulic fluid to the secondary device actuator when the pressure line is de-pressurized, the bootstrap hydraulic reservoir further comprising a check valve fluidly connected to the pressure line of the hydraulic fluid system between the hydraulic accumulator and the outlet of the pump of the hydraulic fluid system, the check valve being biased to a second closed position, the check valve moving to a third open position against the bias by pressurized hydraulic fluid flowing through the pressure line toward the piston chamber.

8. The bootstrap hydraulic reservoir of claim 1, wherein the valve actuator comprises a solenoid.

9. A hydraulic fluid system comprising:
   - a hydraulic pump comprising an inlet and an outlet;
   - a pressure line;
   - a device actuator fluidly connected to the outlet of the hydraulic pump via the pressure line; and
   - a bootstrap hydraulic reservoir comprising:
     - a bootstrap chamber to hold hydraulic fluid;
     - a piston chamber fluidly connected to the pressure line;

a piston comprising a bootstrap end portion held within the bootstrap chamber and a pressure end portion held within the piston chamber;

a hydraulic accumulator fluidly connected to the pressure line such that the hydraulic accumulator is configured to accumulate pressurized hydraulic fluid from the pressure line during operation of the hydraulic fluid system; and a valve fluidly connected to the pressure line between the hydraulic accumulator and the outlet of the hydraulic pump, the valve comprising a closed position, wherein the valve comprises a valve actuator to selectively move the valve to an open position when the pressure line is de-pressurized as a result of the hydraulic fluid system being shut down to enable the hydraulic accumulator to supply the device actuator with a flow of pressurized hydraulic fluid through the pressure line of the hydraulic fluid system.

10. The hydraulic fluid system of claim 9, wherein the hydraulic accumulator supplies the pressure line of the hydraulic fluid system with a flow of pressurized hydraulic fluid toward the outlet of the hydraulic pump of the hydraulic fluid system when the pressure line is de-pressurized and the valve actuator moves the valve to the open position.

11. The hydraulic fluid system of claim 9, wherein the hydraulic accumulator, the piston chamber, and the hydraulic pump are each fluidly connected to the pressure line of the hydraulic fluid system, and wherein the hydraulic accumulator is between the piston chamber and the hydraulic pump.

12. The hydraulic fluid system of claim 9, wherein the valve is a check valve that is biased to the closed position, the valve actuator selectively moves the valve to the open position against the bias, and the valve moves to the open position against the bias by pressurized hydraulic fluid flowing through the pressure line toward the piston chamber.

13. The hydraulic fluid system of claim 9, wherein the valve is an active valve, the open position is a first open position, and the closed position is a first closed position, the bootstrap hydraulic reservoir further comprising a check valve fluidly connected to the pressure line between the hydraulic accumulator and the outlet of the hydraulic pump, the check valve being biased to a second closed position, the check valve moves to a second open position against the bias by pressurized hydraulic fluid flowing through the pressure line toward the piston chamber.

14. The hydraulic fluid system of claim 9, wherein the open position is a first open position, the valve being fluidly connected to a secondary device actuator, the valve comprising a second open position wherein the hydraulic accumulator supplies a flow of pressurized hydraulic fluid to the secondary device actuator.

15. The hydraulic fluid system of claim 9, wherein the valve is an active valve, the open position is a first open position, and the closed position is a first closed position, the active valve being fluidly connected to a secondary device actuator, the active valve comprising a second open position wherein the hydraulic accumulator supplies a flow of pressurized hydraulic fluid to the secondary device actuator when the pressure line is de-pressurized, the bootstrap hydraulic reservoir further comprising a check valve fluidly connected to the pressure line between the hydraulic accumulator and the outlet of the hydraulic pump, the check valve being biased to a second closed position, the check valve moves to a third open position against the bias by pressurized hydraulic fluid flowing through the pressure line toward the piston chamber.

16. The hydraulic fluid system of claim 9, wherein the valve actuator comprises a solenoid.

17. A bootstrap hydraulic reservoir for a hydraulic fluid system, the bootstrap hydraulic reservoir comprising:
a bootstrap chamber to hold hydraulic fluid;
a piston chamber fluidly connected to a pressure line of the hydraulic fluid system;
a piston comprising a bootstrap end portion held within the bootstrap chamber and a pressure end portion held within the piston chamber;
a hydraulic accumulator fluidly connected to the pressure line of the hydraulic fluid system such that the hydraulic accumulator is configured to accumulate pressurized hydraulic fluid from the pressure line; and
a check valve fluidly connected to the pressure line of the hydraulic fluid system between the hydraulic accumulator and an outlet of a pump of the hydraulic fluid system, the check valve being biased to a closed position wherein the hydraulic accumulator supplies pressurized hydraulic fluid to the piston chamber, the check valve comprising a valve actuator to selectively move the check valve against the bias to an open position when the pressure line of the hydraulic fluid system is de-pressurized as a result of the hydraulic fluid system being shut down to enable the hydraulic accumulator to supply a device actuator of the hydraulic fluid system that is fluidly connected to the outlet of the pump with a flow of pressurized hydraulic fluid through the pressure line of the hydraulic fluid system.

18. The bootstrap hydraulic reservoir of claim 17, wherein the hydraulic accumulator supplies the pressure line of the hydraulic fluid system with a flow of pressurized hydraulic fluid toward the outlet of the pump of the hydraulic fluid system when the pressure line is de-pressurized and the valve actuator selectively moves the check valve to the open position.

19. The bootstrap hydraulic reservoir of claim 17, wherein the hydraulic accumulator, the piston chamber, and the pump are each fluidly connected to the pressure line of the hydraulic fluid system, and wherein the hydraulic accumulator is between the piston chamber and the pump.

20. The bootstrap hydraulic reservoir of claim 17, wherein the open position is a first open position, the bootstrap hydraulic reservoir further comprising an active valve fluidly connected to a secondary device actuator, the active valve comprising a second open position wherein the hydraulic accumulator supplies flow of pressurized hydraulic fluid to the secondary device actuator when the pressure line is de-pressurized.

* * * * *